United States Patent Office

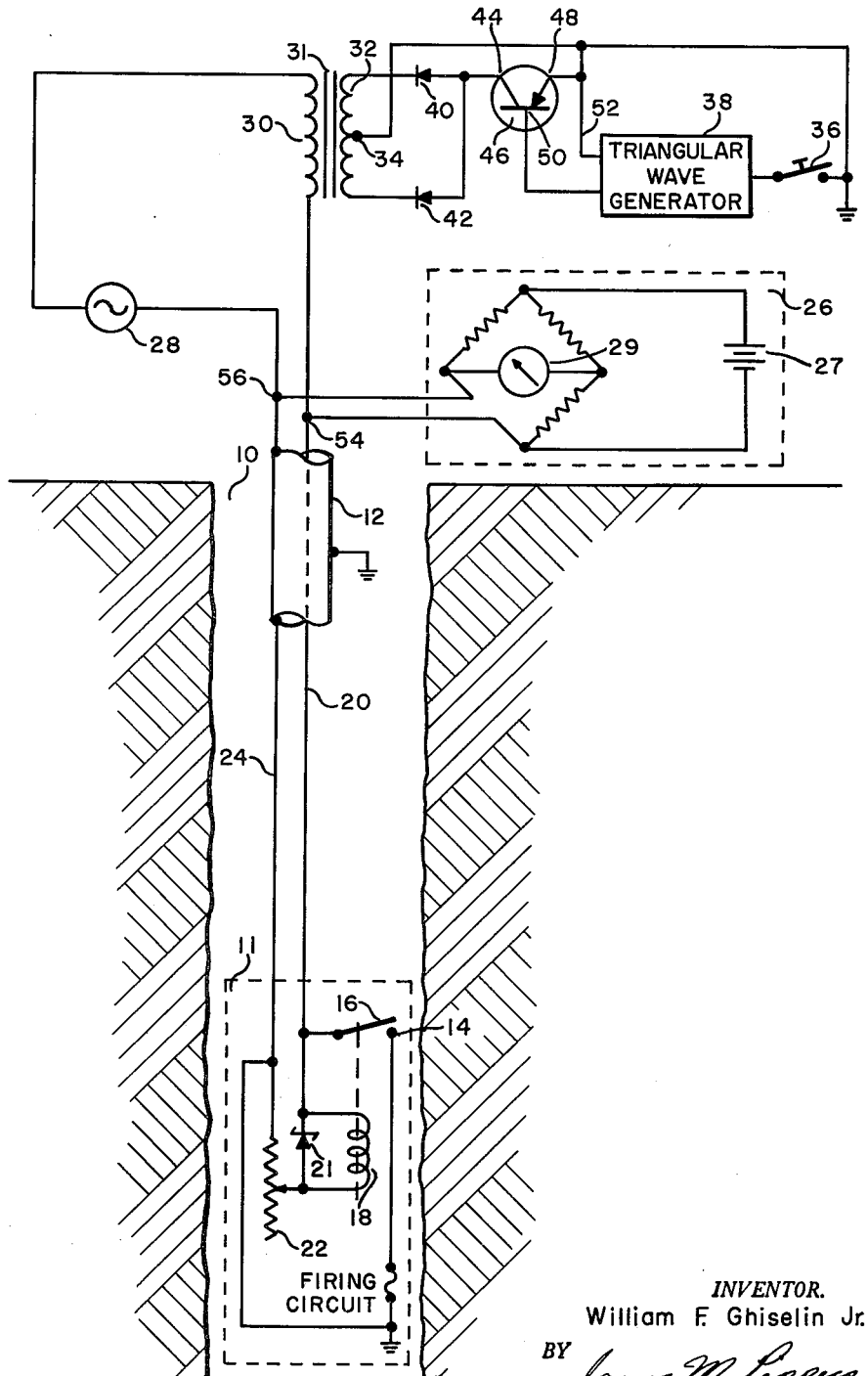

3,028,528
Patented Apr. 3, 1962

---

3,028,528
STABILIZED SIGNAL AND FIRING CIRCUIT
FOR WELL TOOLS
William F. Ghiselin, Jr., Houston, Tex., assignor to Halliburton Company, a corporation of Delaware
Filed May 2, 1960, Ser. No. 26,269
10 Claims. (Cl. 317—80)

This invention generally relates to well logging apparatus and more specifically to apparatus which may be actuated from the earth's surface by an electrical impulse while a measurement is made simultaneously of a subsurface electrical parameter.

A need has arisen for apparatus to be used in the exploration and completion of well bores which will continually measure an electrical parameter of earth formation adjacent the bore hole and transmit a representative signal to the earth's surface while simultaneously but intermittently energizing a circuit within the tool by application of an electrical pulse of frequency different than that of the transmitted signal.

In a formation testing tool, for example, a device may be run into the well by means of a single conductor cable and positioned adjacent a previously chosen earth formation. Such formation may be located by measurement of an electrical characteristic which is transmitted to the earth's surface as an electrical signal. Once located, an explosive charge contained within the tool is fired, allowing a sampling pad to expand against the bore hole wall in sealing relationship. This charge is fired by application of an alternating current from the surface to an electromagnetic relay within the tool. A subsequent application of the actuating current opens the valve connected to the aforementioned pad and allows formation fluids to enter into a sample chamber within the tool. A measurement may be made of the pressure within the chamber as the fluid enters. Such pressure measurement may be made by a conventional Bourdon gauge in connection with a variable resistor.

Such variable resistor is series connected to the conductor and sheath of a logging cable in a manner forming one arm of a D.C. resistance bridge circuit located at the earth's surface. When thus connected the unbalance of the bridge is an indication of the pressure within the chamber. A subsequent pulse of the actuating current may be used to close off the chamber and release the tool for retrieval. For further description of such apparatus, reference may be had to commonly assigned Patent No. 2,982,130 issued to D. B. McMahan, on May 2, 1961 for "Well Formation Testing Apparatus."

When such apparatus is used in connection with a single conductor cable, the variable resistance and the actuating solenoid of the relay will be connected in series. The relay coil will be of material having considerable temperature coefficient. Well temperatures may vary from 90° F. to as high as 400° F. throughout the well bore. This temperature change causes a substantial change in resistance in the relay and consequently effects to an objectionable degree the voltage appearing across the series connected resistance. Such resistance change in the relay thus appears as a change in voltage across the surface located indicating resistance bridge and produces spurious indications of the changes of the variable resistance.

A single conductor cable may have considerable capacity between its conductor and external sheath. With cables of ten to twenty thousand feet in length, its total capacitance may reach a very high value, presenting problems of interference with a direct current signal when an alternating current frequency is suddenly applied to the cable and then suddenly removed. Application of such alternating current charges the cable to the extent allowed by its capacitance characteristic. Upon removal of the alternating current a finite time is required for the charge to leak off, determined by the characteristics of the cable. This charge and discharge results in interference with the relatively small D.C. voltage of the resistance bridge circuit.

It is therefore an object of this invention to eliminate the effects of temperature on a resistance bridge circuit having one leg in series with a relay coil of considerable temperature coefficient.

It is a further object of this invention to obtain a correct measurement of a small D.C. signal through a conductor of a logging cable when a relatively large amplitude A.C. voltage is intermittently applied and removed from such cable.

These and other objects of this invention are accomplished by connecting a voltage regulating means having substantially zero temperature coefficient in parallel with the relay coil. When so provided the voltage drop across the two parallel connected elements will remain the same and the only unbalance indication of the resistance bridge will be due to change in value of the adjustable resistor.

Interference of such D.C. signal by A.C. voltages is prevented by connecting in series with the source of such A.C. voltage and an impedance which may be varied by means of a separate control means having a saturable element. When so controlled the A.C. voltage is applied gradually, in response to gradual saturation of the control element. When the control element is saturated the primary of the impedance means is decreased in resistance value, permitting the A.C. power to be applied to the cable.

When the current source is disconnected, the current through the impedance means decreases to termination as the impedance gradually increases in value. This allows the power to be removed from the cable in a gradual manner, preventing interference with a D.C. voltage signal appearing on the cable.

The above and other objects of the invention will be better understood from the following description taken in reference with the accompanying schematic drawing.

The single FIGURE of the drawing shows a schematic circuit of the apparatus.

Referring now to the drawing, there is seen a bore hole 10 into which is lowered a logging tool 11, for example a formation testing tool, from a cable 12. A firing circuit (indicated as a fuse) is provided for the purpose of opening and closing valves (not shown). The firing circuit is connected to a stationary contact arm which in turn is conected to a cable by means of a movable contact 16. Contact 16 is mechanically actuated by a coil 18. Coil 18 is energized by current introduced from the surface through a center conductor 20 of the cable 12. The firing and actuating circuit is disconnected from the center conductor at all other times. Connected in parallel with the relay coil 18 is a "Zener" diode 21. Connected in series with the diode and the relay coil is a variable resistor 22. Resistor 22 forms one leg of a resistance bridge circuit 26 which is located at the earth's surface. Circuit 26 is energized by a source of D.C. potential 27. Connected in series between conductor 20 and sheath 24 is a source of exciting A.C. current 28 and the primary 30 of a current transformer 31. A secondary 32 of transformer 31 has a center tap 34 which is connected to ground and to one terminal of a switch 36. Switch 36 is connected to a triangular wave generator 38 in a manner controlling its operations. Each end of secondary 32 is respectively connected through diodes 40 and 42 to the collector electrode 44 of a power transistor 46. Transistor 46 has an emitter electrode 48 connected to ground and a base electrode 50 connected to the output of wave generator 38. A negative terminal 52 of generator 38 is connected to ground.

To actuate the firing circuit, switch 36 is closed, energizing generator 38. The output of generator 38, a voltage of "sawtooth" character, causes the base current of transistor 46 to increase slow and gradually until saturation is reached. The alternating current of source 28 is transferred through the primary 30 to the secondary 32 and rectified by diodes 40 and 42. The rectified current is applied to collector electrode 44. When transistor 46 becomes saturated by means of current derived from generator 38, the transistor 46 acts as though a short circuit exists between collector 44 and emitter 48, allowing current to flow through the secondary 32 and consequently the primary 30. Such current flow will continue until the base current of transistor 46 is subsequently decreased to a sufficiently low value. Effectively then, when transistor 46 is saturated, the primary 30 of transformer 31 appears as a low impedance and A.C. voltage may be applied through the cable for down hole use.

To terminate the flow of alternating current through the cable, switch 36 is opened. The base current of transistor 46 decreases, causing the current through transistor 46 and secondary 32 to decrease. As current flow through transformer 31 decreases, the primary 30 has an effective increase in impedance in series with the A.C. source 28. The gradual increase and decrease of A.C. current through the cable 12 and contact 14 and 16 allows the firing circuit to be actuated and the power then removed without upset to the D.C. resistance bridge 26.

The temperature effects from relay coil 18 are stabilized by means of "Zener" diode 21 connected in parallel. This diode should be of zero temperature coefficient to provide a constant voltage difference between terminals 54 and 56 which otherwise would vary as the resistance of coil 18. The "Zener" diode 21 is provided to begin conduction at a voltage pre-determined to insure that at all times a constant voltage exists across terminals 54 and 56. If this voltage remains constant and the direct current source 27 is constant, only the change in value of resistance 22 will cause an unbalance of bridge circuit 26 to be indicated by meter 29. If the desired constant D.C. voltage level is larger than the initiating voltage for conduction of available diodes 21, the diode may be replaced by series string of similar diodes whose total initiating voltage for conduction is of the value desired.

While the particular embodiments of the present invention have been shown and described, it will be obvious to those skilled in the art that changes and modifications may be made without departing from this invention and therefore the aim in the appended claims is to cover all such changes and modifications as fall within the true spirit and scope of this invention.

That being claimed is:

1. A system of the class described, comprising, a direct current measuring circuit, a logging cable having at least two paths of current flow, a variable resistance sensing element and an actuating means connected in series through said cable paths to said measuring circuit, an alternating current source, an externally controlled variable alternating current impedance means, said source and said impedance means being in series connection across said cable paths, switch means, and means in connection with said impedance means and said switch means to gradually reduce the value of said impedance to effectively close the circuit of said source on actuation of said switch means and to increase the value of said impedance to effectively open the circuit of said source upon release of said switch means whereby said actuating means is energized upon actuation of said switching means without disturbance of a direct current measurement through said sensing element by said measuring circuit.

2. The system of claim 1 wherein one or more "Zener" diodes are in series connection to one another and in shunt connection across said actuating means.

3. A system of the class described, comprising, a Wheatstone bridge measuring circuit, a loggging cable having at least two paths of current flow, a variable resistance sensing element and an actuating means connected in series through said cable paths to the measuring arm of the bridge circuit, an alternating current source, an externally controlled variable alternating current impedance means, said source and said impedance means being in series connection across said cable paths, switch means, and means in connection with said impedance means and said switch means to gradually reduce the value of said impedance to effectively close the circuit of said source on actuation of said switch means and to increase the value of said impedance to effectively open the circuit of said source upon release of said switch means whereby said actuating means is energized upon actuation of said switching means without upset of a direct current measurement through said sensing element by said bridge circuit.

4. The system of claim 3 wherein a rectifying means of selected direct current flow initiating potential is in shunt connection across said actuating means.

5. The system of claim 4 wherein the rectifying means is one or more "Zener" diodes connected in series.

6. A system of the class described, comprising, a measuring circuit, a logging cable having at least two paths of current flow, a variable resistance sensing element and an actuating means connected in series through said cable paths to said measuring circuit, an alternating current source, an externally controlled variable alternating current impedance means, said source and said impedance means being in series connection with one another across said cable paths, switch means, and means in connection with said impedance means and said switch means gradually reducing the value of said impedance to effectively complete the circuit of said source on actuation of said switch means and to increase the value of said impedance to effectively disconnect the circuit of said source upon release of said switch means whereby said actuating means is energized upon actuation of said switching means without disturbance to said measuring circuit.

7. The system of claim 6 wherein said impedance means is a transformer with means to variably shunt its secondary in response to actuation of said switching means.

8. The system of claim 6 wherein the measuring circuit is a Wheatstone bridge having the cable paths and sensing element in series connection as the measuring arm of said bridge.

9. The system of claim 8 wherein a "Zener" diode is connected in shunt across said actuating means.

10. The system of claim 9 wherein said actuating means connects a firing means into series connection with said source, said impedance means and said cable paths upon actuation of said switch means.

References Cited in the file of this patent

UNITED STATES PATENTS

| | | |
|---|---|---|
| 2,514,935 | Clapp | July 11, 1950 |
| 2,617,852 | Waters | Nov. 11, 1952 |
| 2,768,684 | Castel et al. | Oct. 30, 1956 |
| 2,931,971 | May | Apr. 5, 1960 |
| 2,935,021 | Niles | May 3, 1960 |
| 2,961,602 | Bender | Nov. 22, 1960 |